(12) United States Patent
Margineantu et al.

(10) Patent No.: US 8,756,177 B1
(45) Date of Patent: Jun. 17, 2014

(54) METHODS AND SYSTEMS FOR ESTIMATING SUBJECT INTENT FROM SURVEILLANCE

(75) Inventors: Dragos Dorin Margineantu, Bellevue, WA (US); Tomas Singliar, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 13/089,085

(22) Filed: Apr. 18, 2011

(51) Int. Cl.
*G06N 5/00* (2006.01)

(52) U.S. Cl.
USPC .............................. 706/13; 382/107; 705/75

(58) Field of Classification Search
USPC .......................................................... 706/13
See application file for complete search history.

(56) References Cited

U.S. PATENT DOCUMENTS

| | | | | |
|---|---|---|---|---|
| 2003/0142851 | A1* | 7/2003 | Brueckner et al. | 382/107 |
| 2009/0012922 | A1* | 1/2009 | Tesauro et al. | 706/12 |
| 2010/0318512 | A1* | 12/2010 | Ludwig | 707/722 |

OTHER PUBLICATIONS

Prediction of intent in robotics and multi-agent systems, Demiris, Cogn Process, May 4, 2007, pp. 151-158.*
Bonet, B.; Deterministic POMDPs Revisited; Department of Computers, University of Simon Bolivar; Caracas, Venezuela; In Proc. of 25th Conference on Uncertainity in Artificial Intelligence (UAI, 2009); 8 pages.
Ng, A. et al; Algorithms for Inverse Reinforcement Learning; CS Division, U.C. Berkeley, Berkeley, CA; In Proceedings of ICMML, 2000; 8 pages.
Zeibart, B. et al; Maximum Entropy Inverse Reinforcement Learning; School of Computer Science, Carnegie Mellon University; Pittsburgh, PA; Proceedings of AAAI, 2008; 6 pages.
Pannetier, B. et al.; Ground Moving Target Tracking with Road Constraint; Proceedings of SPIE, vol. 5429, 2004; pp. 138-149.
Kirubarajan, T. et al.; Tracking Ground Targets with Road Constraints Using an IMM Estimator; IEEE 1998; pp. 5-12.

* cited by examiner

*Primary Examiner* — Jeffrey A Gaffin
*Assistant Examiner* — Kalpana Bharadwaj
(74) *Attorney, Agent, or Firm* — Armstrong Teasdale LLP (57) ABSTRACT

A computer-based method for analyzing the incentives and predicting the future actions of agents is described. The method includes storing, in a computer memory, data relating to previously observed behavior of at least one of an agent of interest and agents that can be assumed to hold similar utilities to the agent of interest, thereby defining an agent class, deriving with a processing device and based on the stored data, a set of unique incentives that agents in the agent class would have to hold for their observed behavior to be considered rational by an observer of the behavior, observing a short sequence of behavior of the agent of interest, inputting the observed behavior sequence to an analyzer, deriving specific goals of the agent driving that behavior instance, and predicting future actions of the agent of interest based on a maximization of reward for the agent of interest and the derived goals, the reward based on the derived incentives.

21 Claims, 10 Drawing Sheets

METHODS AND SYSTEMS FOR ESTIMATING SUBJECT INTENT FROM SURVEILLANCE

BACKGROUND

The field of the disclosure relates generally to surveillance data analysis, and more specifically, to methods and systems for estimating subject intent from surveillance.

Analysis of surveillance data is a major bottleneck in improving the situational awareness in security applications. Such security applications can be considered to range from public space surveillance to war theatre surveillance operations. Specifically, there is an abundance of video data available to consumers of such data, many times more than there are available man-hours to watch such video data. Automating analysis tasks is therefore a highly desirable goal. Among the tasks of an intelligence analyst is the estimation of what an observable agent (a person, or, by extension, a vehicle) intends to do, based on its previous behavior. Such observation is typically from video. While the above appears to be directed to a military intelligence context, other related contexts are contemplated.

The above described problem in the automating of the analysis tasks is challenging because the space of possible utility functions is very large. The essence of a successful application of an automated analysis method lies in devising a-priori value function representations that enable a compact representation of the large function space so that the computations become tractable.

The problem can be cast in terms of utility determination. One related approach is termed "Inverse Reinforcement Learning" in machine learning and artificial intelligence literature. Rather, work in Inverse Reinforcement Learning work typically has the goal of repeating a behavior shown in a set of examples typically performed by a person.

BRIEF DESCRIPTION

In one aspect, a computer-based method for analyzing the incentives and predicting the future actions of agents whose incentives are unknown is provided. The method includes storing, in a computer memory, data relating to previously observed behavior of at least one of an agent of interest and agents that can be assumed to hold similar utilities to the agent of interest, thereby defining an agent class, deriving with a processing device and based on the stored data, a set of unique incentives that agents in the agent class would have to hold for their observed behavior to be considered rational by an observer of the behavior, observing a short sequence of behavior of the agent of interest, inputting the observed behavior sequence to an analyzer, deriving specific goals of the agent driving that behavior instance, and predicting future actions of the agent of interest based on a maximization of reward for the agent of interest and the derived goals, the reward based on the derived incentives.

In another aspect, one or more computer-readable storage media having computer-executable instructions embodied thereon are provided. Wherein when executed by at least one processor, the computer-executable instructions cause the at least one processor to receive and store data indicative of previous behavior of at least one of an agent of interest and agents that can be assumed to hold similar utilities to the agent of interest, thereby defining an agent class, derive a set of unique incentives that agents in the agent class would have to hold for the observed behavior to be considered rational by an observer of the behavior, receive data indicative of a short sequence of behavior of the agent of interest, derive specific goals of the agent driving that behavior instance, and predict future actions of the agent of interest based on a maximization of reward for the agent of interest, the reward based on the derived incentives.

In still another aspect, a method is provided that includes utilizing the output of a tracking system to track and store observations of agent behaviors, estimating a reward function for the agent based on the stored observations of agent behaviors, at least one of analyzing rewards for expected agent behaviors, predicting further agent behaviors, and analyzing tracks of agents behaviors to determine whether the tracks are rational under any set of utilities consistent with utility bounds derived from an agent class, and determining, based on alerting rules defined by a user, whether the alert was understood and determined to be non-alertable, whether the alert should simply be discarded with no further processing, whether the alert is a result of behavior misunderstanding on part of the system and providing a more relevant explanation, and whether to process a good alert as an operational event.

The features, functions, and advantages that have been discussed can be achieved independently in various embodiments or may be combined in yet other embodiments further details of which can be seen with reference to the following description and drawings.

DETAILED DESCRIPTION

Described in embodiment herein are sets of interconnected methods for analyzing the incentives and predicting the future actions of agents. The agent actions may be assumed to be rational to an observer but incentives attributed to such agents are a-priori unknown. One method includes the steps of observing previous behavior of either the agent of interest, or of other agents that can be assumed to hold similar utilities, deriving a set of incentives that the agent(s) would have to hold for their observed movements to be considered rational to an observer of the movements, observing a short sequence of behavior for the agent of interest, and predicting future actions of the agent on the basis of the agent's maximization of its expected reward. In particular embodiments, surveillance data is utilized to predict the future actions. Such surveillance data includes, for example, vehicle movement tracks such as (Moving Target Indicator) MTI or (Synthetic Aperture RADAR) SAR data as is collected in military intelligence.

FIGS. 1-4 provide understanding as a concrete example of behavior analysis. Referring to the user interface 1 of FIG. 1, the agent 10 is a vehicle being observed at discrete times as it moves on the road network 20 of Seattle. For this example it is assumed that the utilities are known and represented by the time cost of travel on various classes of roads. The predictive question in this example is where is the agent (vehicle) going? To simplify the example the set of the vehicle's possible destinations is limited to five, which are shown individually in the user interface 1 as destination probabilities 30, 32, 34, 36, and 38 and denoted in the map as squares.

In FIGS. 1-4, each observed agent position is represented by a circle. The consecutive observations (circles) are connected with lines to show the sequencing of the observations. The considered destinations are denoted by squares. The progress bars in the respective destination probabilities 30, 32, 34, 36, and 38 show the probability, for each destination 50, 52, 54, 56, and 58, that the agent is headed there. In the example of FIGS. 1-4, the vehicle is in Seattle. This information alone does not reveal any information about its destination, therefore in FIG. 1, the probability bars therefore show all destinations as equally probable.

Figure 1:
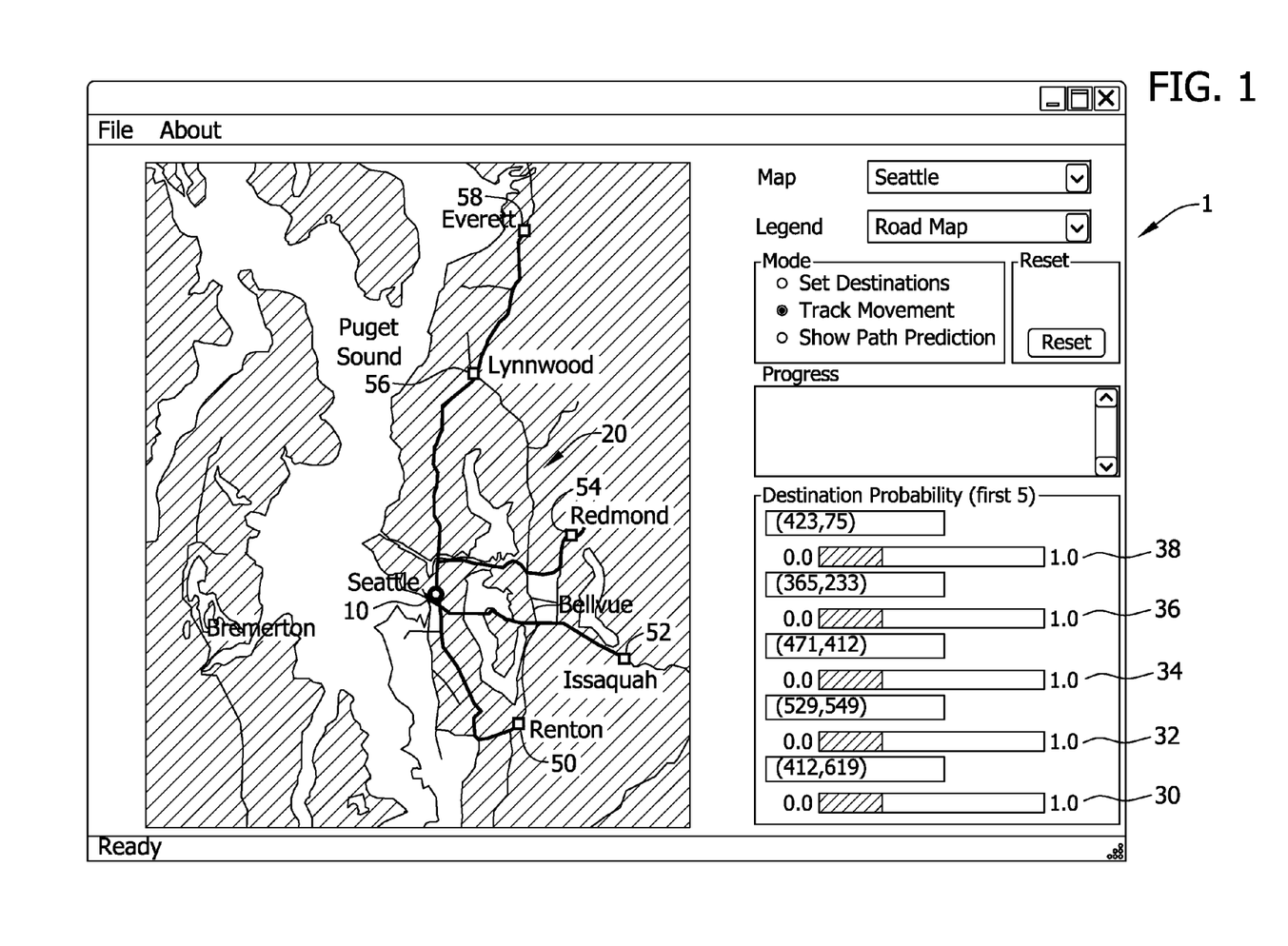
FIG. 1 is a computer display illustrating an example of behavior analysis, based on an agent (vehicle) being observed at a first discrete time as it moves on a road network, the probabilities of each destination as being the final destination being equal.
Figure 2:
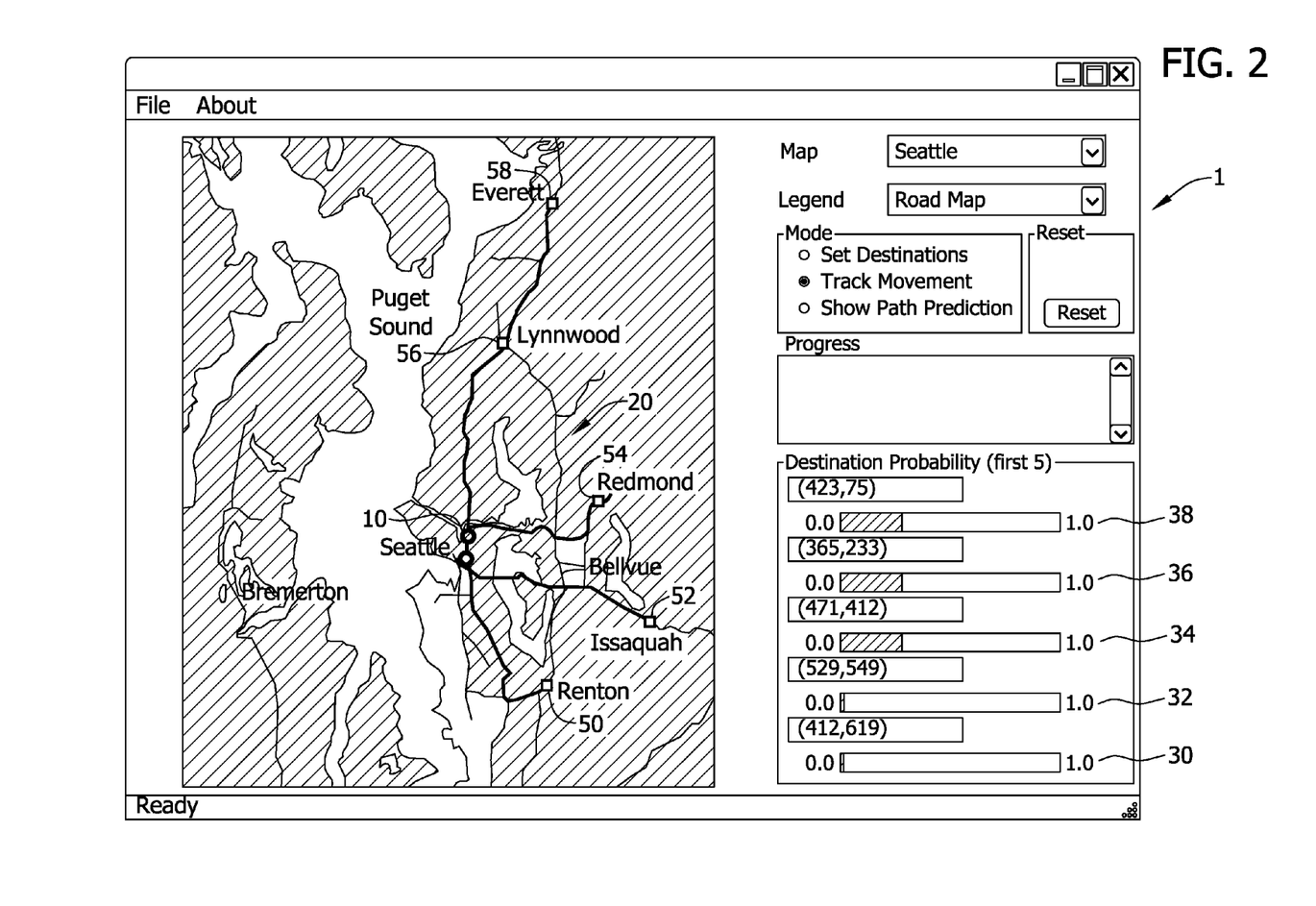
FIG. 2 is a computer display further illustrating the example of FIG. 1, the agent being observed at a second discrete time as it moves on the road network, the probabilities of certain destinations as being the final destination increasing based on the movement of the agent.

In FIG. 2, the agent 10 has moved slightly northward. This action is consistent with heading to any of the three northernmost destinations 54, 56, and 58, but inconsistent with the two southernmost destinations 50 and 52. Thus, as shown in the progress bars of the user interface, the probability of the three destinations is increased at the expense of the southern destinations. Since the agent's expected cost to all three northern destinations is reduced by the same amount, they remain equally probable.

Figure 3:
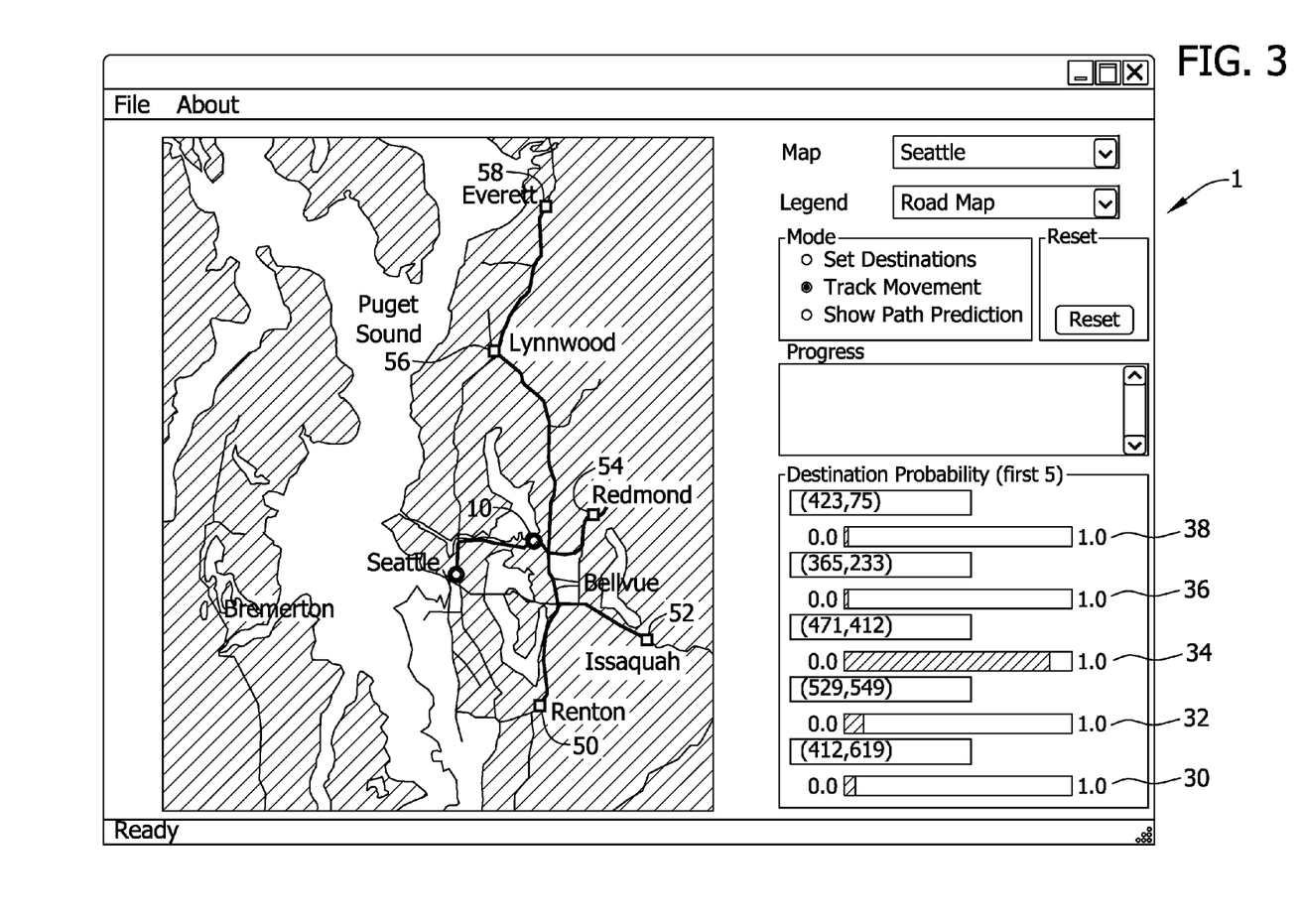
FIG. 3 is a computer display further illustrating the example of FIG. 1, the agent being observed at a third discrete time as it moves on the road network, the movement reducing its expected cost to one of the possible destinations the most, making that destination has become the most probable estimate.

In FIG. 3, the agent 10 (vehicle) has headed eastward. Because this action reduced its expected cost to destination 54 (Redmond) the most, that destination has become the most probable estimate, again, as shown in the probability bars 30-38.

Figure 4:
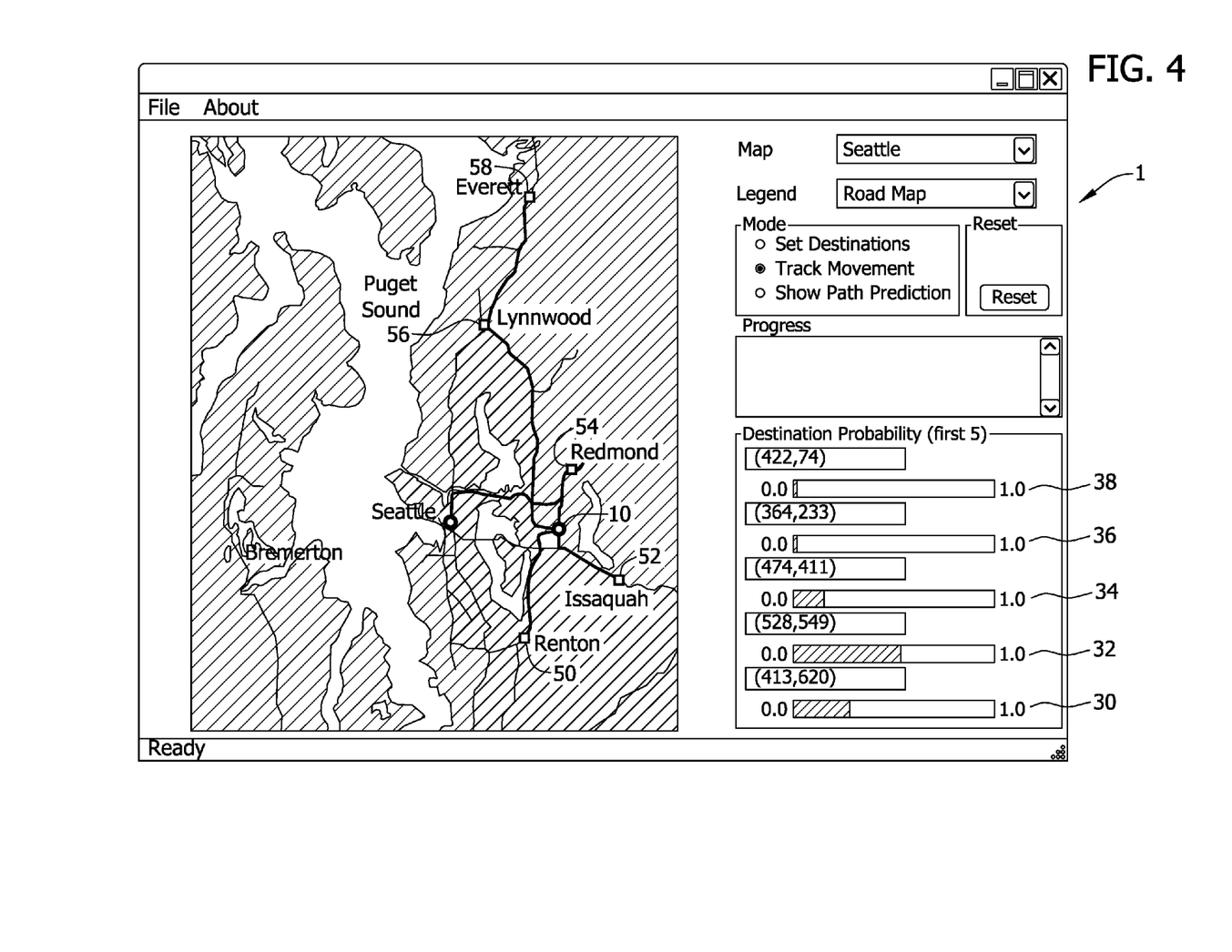
FIG. 4 is a computer display further illustrating the example of FIG. 1, the agent being observed at a fourth discrete time as it moves on the road network, the movement being inconsistent with proceeding to the previously determined most probable destination, the destination probabilities having been updated accordingly.

However, as shown in FIG. 4, the agent 10 has continued to the neighborhoods of Bellevue. This action is inconsistent with proceeding to destination 54 (Redmond), so the two southern destinations 50 and 52 are now the most probable ones, as shown by the probability bars 30-38.

However, in the last step, an anomaly might be declared as the agent has not behaved rationally with respect to any of the defined destinations. In the example of FIGS. 1-4, it is rather clear that there is insufficient coverage of possible destinations. However, if the destinations are well covered, the behavior of agent 10 is flagged for further analysis since an alternative explanation should be sought. The embodiments described herein are directed to systems and computational methods for assigning probabilities of being the goal of an agent in question to each member of a set of possible goals.

In the following paragraphs, the assumptions made in the example of FIGS. 1-4 are relaxed. Specifically, word "costs" is used interchangeably with "rewards", "incentives" or "utilities". Mathematically, minimizing cost and maximizing rewards are identical, as are the optimization procedures involved. Also, whether utilities are associated with a state of the world or an agent's action is a mathematical nuance; both formulations are equally powerful and can be mutually converted without loss of generality.

Figure 5A:
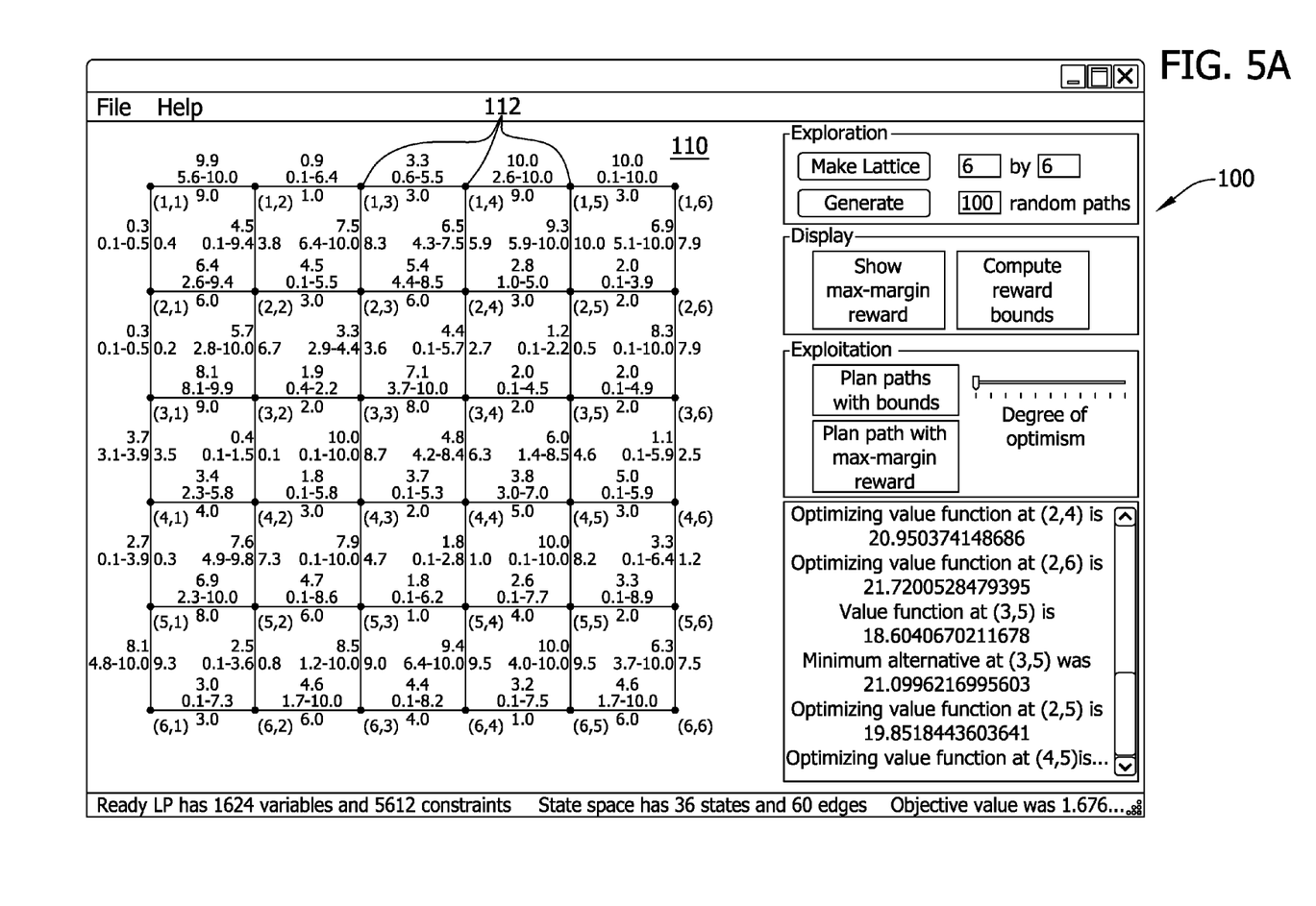
FIGS. 5A and 5B are embodiments of a user interface for a tool developed for the purpose of determining costs of actions in a state space, such as moving along the road network as illustrated in FIGS. 1-4, and capable of visualizing planar-shaped state spaces such as the regular mesh shown.
Figure 5B:
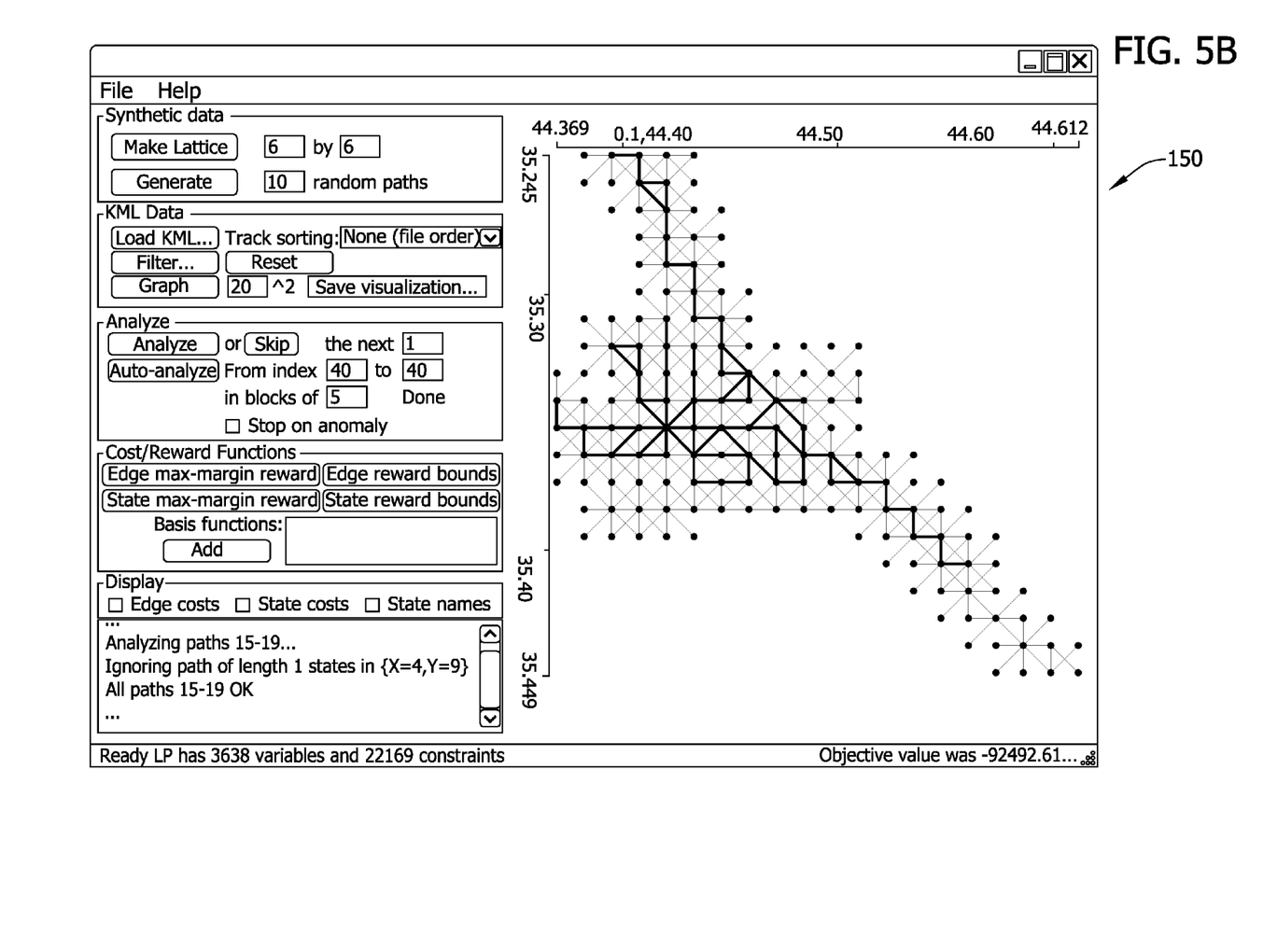
Figure 6:
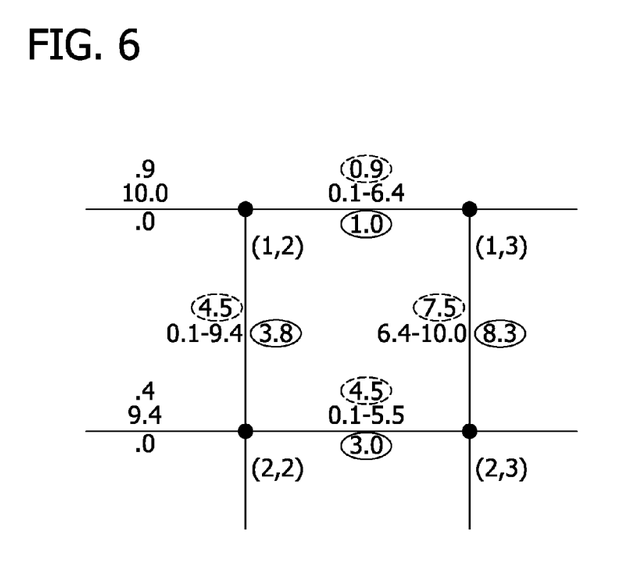
FIG. 6 is an enlargement of a portion of the mesh network of FIG. 5A, including encircled numbers that represent the true and estimated costs of traversing from node to node.

FIGS. 5 and 6 illustrate deriving the cost of actions in a mesh space 100. In the example of FIGS. 1-4, it was assumed that the costs which the agent incurs are known. That is, for each road, it was known how fast one could travel on the road and therefore the time cost of travel on each road could be determined. The space of actions available to the agent at each location was identical to the set of adjacent locations to which to move, and useable to determine agent intent. However, in the simplest possible generalization of the example, the state of the roadways may not be known, and therefore how long it takes to traverse each road segment cannot be known. As such, observation of behavior allows for determination of costs to an agent for various actions.

FIGS. 5A and 5B are a screenshots of a user interface 100 and 150 respectively for a tool developed for the purpose of determining such costs. To a first approximation, the graph 110 of nodes 112 arranged in a square grid is thought of as a map of a part of a city. It is observed that many people take trips from one location (node) to another location (another node), observing the path they take and observing their trip times. From these observations, it can be inferred which road segment combinations are preferable to others. Consider the enlargement of a portion of FIG. 5A shown in FIG. 6, in which the numbers encircled with a solid line represent the true cost of traversing the edge of the graph. These costs are known, for example, to the agents being observed, but not to the observer. Any agent going from node (1,2) to node (2,3) would always prefer the route through node (2,2) at a cost of 6.8=3.8+3.0 to the route through node (1,3) at a cost of 9.3=1.0+8.3 in order for the route to be considered rational. From observing a multiplicity of agents take that choice, an algorithm notices that the sum of the costs on the latter route option must exceed the sum of the costs on the former route option. Thus a system of inequalities is constructed which is expressed as a constraint set of a linear program. A linear program solver is then used to find the maximum-margin set of costs (encircled with dashed lines), that is a set of costs which makes the observed agent decisions not only be the optimal (rational) decisions, but to make them such by the widest margin (the difference in cost of the optimal and the best sub-optimal solution). Such max-margin costs are estimates, but must necessarily lie between hard bounds (non-circled) imposed by the requirement of optimality of the agent actions.

Figure 7:
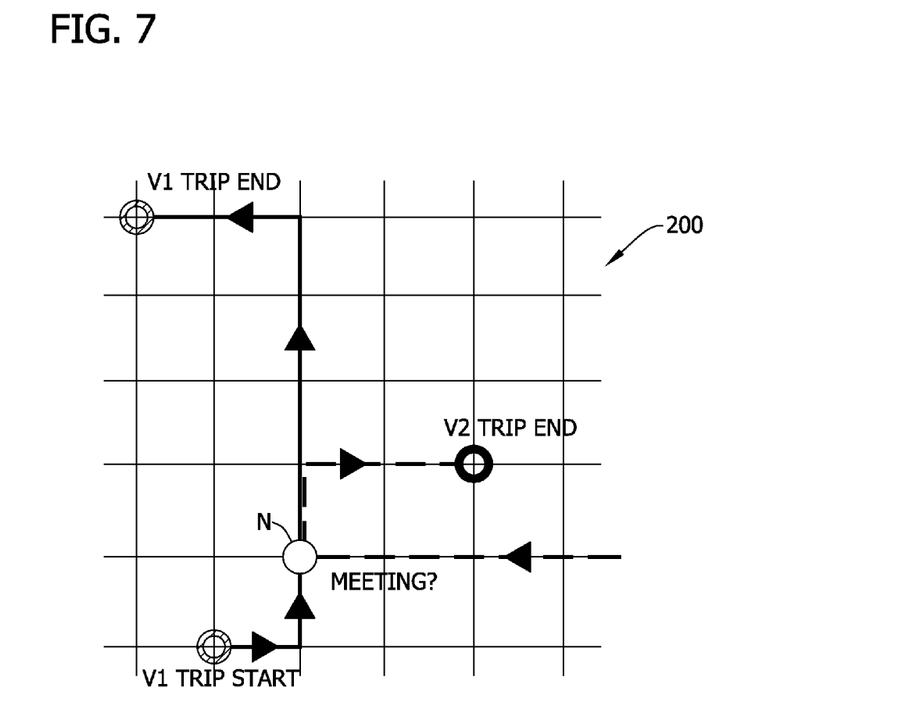
FIG. 7 is a graphical representation of an observation of two agents briefly collocating, the representation relating to an analysis of agent behavior indicating whether the meeting was accidental or intentional.

Also disclosed is a method for using estimations of actions and state costs from multiple observations of action sequences performed either repeatedly by the same agent, or by a class of agents that have similar cost models, to build a mode of reasoning, exemplified by the meeting detection scenario described in the following sentences. Referring to FIG. 7, which is indicative of an analysis of accidental vs. intentional meeting, it is observed that two agents briefly collocate (e.g. two cars stopping next to each other), at a node (N) then go their separate ways. It is quite common to be able to discern this in the kind of imagery intelligence analysts work with, but we are unable to ascertain whether this was accidental or whether an exchange has taken place. Assuming that the grid 200 is a regular road grid, common-sense reasoning would be along the lines of "since both agents could have proceeded to their destination more directly, there is something else explaining their seemingly irrational trajectories". Thus it is likely that the meeting at node N was intentional. The described embodiments also formalize this mode of reasoning about agents' utilities.

These examples are illustrative and not intended to limit the applicability of the invention to analyzing movements in a two-dimensional grid. While that is the most readily accessible application of the described methods, as analytical methods the components of the described embodiments are in principle applicable to any state space where the action of an agent changes the state of the world through any action. Thus the example of FIGS. 5 and 6 should be thought of as an image of an abstract space where there are four actions (graph links) available to the agent in most world states (graph nodes).

The embodiments describe a method of analyzing the behavior of agents in terms of their incentive structure and using the results of this description for the purposes of pointing out automatically agents that do not conform to the assumed class of incentive structure (anomaly detection), pointing out agents whose incentives satisfy predefined conditions ("show me all vehicles that have a strongly negative utility for passing through a checkpoint"), predicting single or multiple agent behavior, and understanding a rationale of an agent's action or sequence of actions.

The following paragraphs describe a methodology and a programmed apparatus that provide the functions described by the examples of FIGS. 1-7.

Analyzing the incentive structure through linear programming with basis functions.

In one embodiment, a linear program (LP) in the general case is produced without basis functions as follows: with each state and action pair (s,a), associate a cost function c(s,a). With each destination d, associate a cost-to-go function $V_d(s)$, expressing the unknown shortest distance from s to d. In order to simplify notation when confusion cannot ensue, c(s,s') is used to denote the cost incurred by the unique action a which results in the agent transitioning into s'.

For each observed path $p^i$ specified as an interleaving sequence of states $s_0, a_0, s_1, a_1, \ldots, a_{n-1}, s_n$ and a cost $c^i$, add a constraint of the form $$\sum_t c(s_t, \alpha_t) = c^i.$$

For each state $s_i$ on the path, and neighbor $s_t'=s_{t+1}$, the path through $s_t'$ is at most as good as that through $s_{t+1}$. Therefore, insert a "Bellman" constraint, for example, $V_d(s_t')+c(s_t, s_t') \geq V_d(s_{t+1})$.

For each state $s_i$ on the path, it also holds that $$v_{s_i}(s_j) = \sum_{k=1}^{i-1} \alpha(s_k, \alpha_k).$$

Then, the linear program is solved with respect to the variables representing the values of the costs and value functions using a maximization objective that is the sum of terms expressing the margin for each action taken. For each action $a_i$ on a path $s_0, a_0, s_1, a_1, \ldots, a_{n-1}, s_n$, the margin term is $\mathbf{r} \min_i s_i t'[V]_d (s_i t')+c(s_i t, s_i t')]-V_d(s_i(i+1))$, which can be transformed in a standard way to give a plain linear constraint and an objective term.

When basis functions are present, all value-function terms are replaced by the expression $$\sum_{k'} \alpha_k \phi_k,$$

where the sum ranges over the set of active basis functions indexed by k. The optimization is then with respect to the variables C(s,a) representing the action costs, and the coefficients $a_k$.

Firm bounds on the cost of an action can be established by maximizing/minimizing with respect to the cost variable.

Anomaly Detection.

The following paragraphs switch the mode from "learning" the action costs into analyzing the behavior of a single agent. The cost bounds for each action have been established at this stage of the process. Then, the above paradigm can be used to solve for the particular utility set of the agent. If the LP is infeasible, this agent's utility set deviates substantially from that of the class in which it is assumed to belong and an anomaly is detected.

As to notable intent detection, if the incentives estimated from an instance of the agent's behavior satisfy any of a set of pre-specified alerting criteria, this behavior instance may be pointed out to a user of the system.

Predicting Agent's Future Actions

Once the bounds on the utilities are established, the behavior of an agent maximizing its utilities is largely dictated. The tighter the bounds, the more certainty exists in this prediction. Discussed herein is the deterministic case where an action in a state s reliably leads to a single state s' which is determinable before the action is even contemplated. The computation of the agent's optimal action is then a matter of applying the appropriate dynamic programming algorithm, which are well-understood and efficient in the deterministic case.

Process for Building a Suitable Basis Through Interactive Analysis.

When an anomaly occurs, the analyst is presented with it and can either dispose of the example as uninteresting, and the example will be excluded from further analysis. Otherwise the example can be saved and explained away by other incentives that the agent has, and not be used not extend the basis function set.

Otherwise, a computer user interface is employed to construct a basis function that explains the agent's behavior and extend the basis set. The analyst, or the user interface in his stead, may attach to the basis function metadata indicating, for instance, that positive values of the associated coefficient tend to indicate a benign intent. For instance, for an agent making a side trip (otherwise anomalous, since it involves an irrational choice of a longer route), the analyst may note that the agent passed a desirable location and add "distance to this location" into the basis function set. The system will then re-analyze the behaviors of the agent class and derive the bounds on the rewards associated with being in proximity to this location, explaining the side-trip anomaly.

Suitable Applications

Large-scale analysis of vehicle and person movement data is described. Sources of just data include, but are not limited to surveillance video, GPS (such as from cellular telephones), RFID and other sources of location-based data may be utilized to generate moving target indicator (MTI) data. Such data may be applied in applications related to land, sea, air, and space targets.

Figure 8:
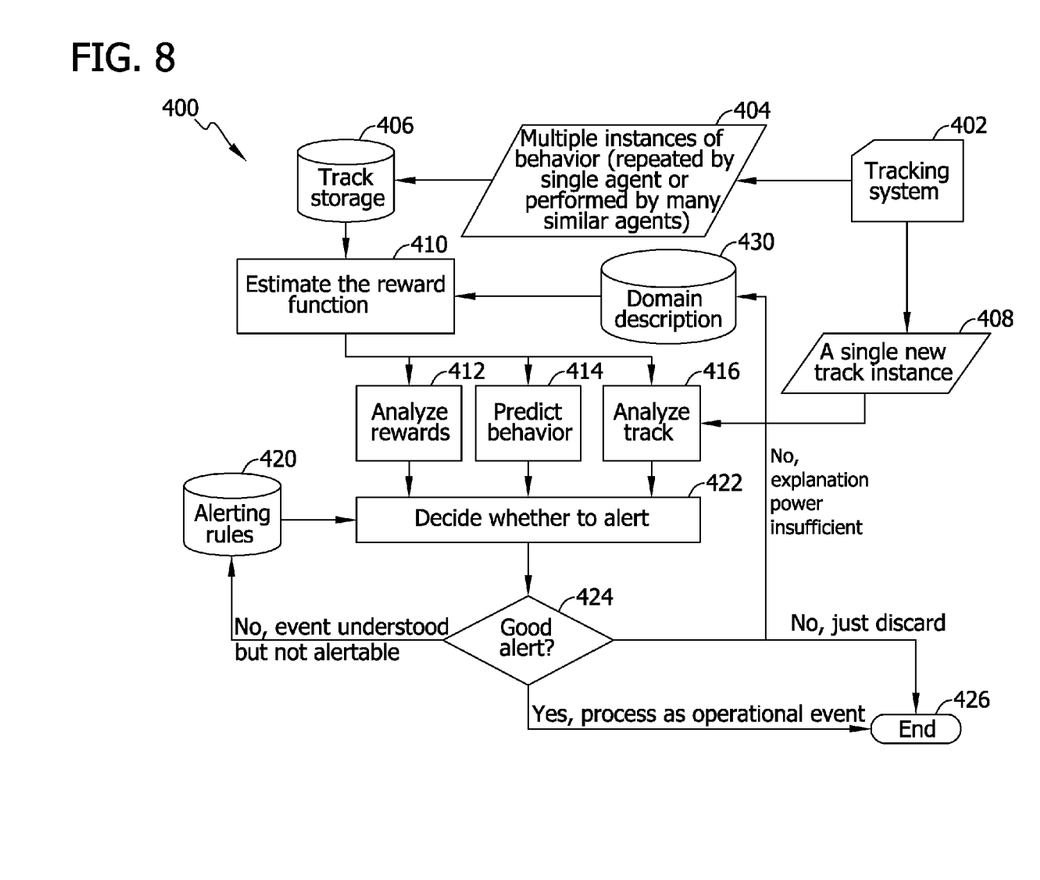
FIG. 8 is a diagram of a data processing system.

Turning now to FIG. 8, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314 and is operable for being programmed with and executing the algorithms described herein.

Processor unit 304 serves to execute instructions for software that may be loaded into memory 306. Processor unit 304 may be a set of one or more processors or may be a multiprocessor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 7 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described system is operable for executing the algorithms described herein. FIG. 8 is a flowchart 400 which summarizes the various algorithms.

Figure 9:
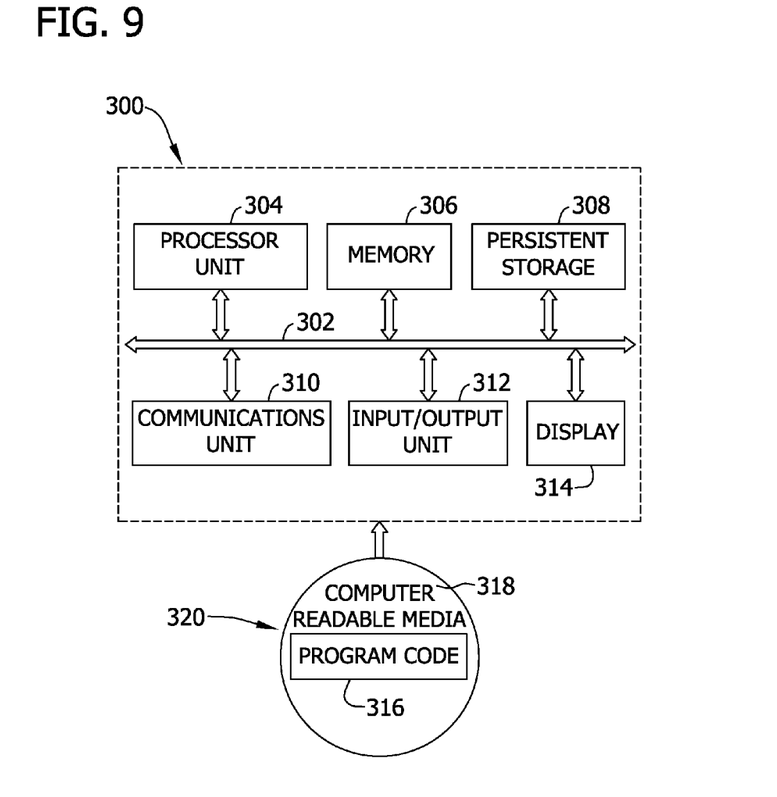
FIG. 9 is a flowchart summarizing a process for analyzing the incentives and predicting the future actions of agents.

A tracking system 402 is utilized to track agent observations. Observations, for example, multiple instances of behavior 404 including those repeated by a single agent or performed by multiple agents are stored within a tracking storage area 406. Tracking system 402 also is configured to recognize instances of new single tracks 408.

Based on the stored behavior, a reward function for the agent can be estimated 410. Based on the estimation 410, rewards for expected behavior can be analyzed 412, further behaviors predicted 414, and tracks analyzed 416. Instances of new single tracks 408 may also be analyzed 416.

Alerting rules 420 along the analyzed rewards 412 for expected behavior, behaviors predicted 414, and tracks analyzed 416 are utilized in deciding 422 whether to issue an alert based on an agent observation. To determine if an alert will be a good alert 424, the system user judges whether the system "understood" the behavior (used the relevant basis functions in the support of the alert), and whether the alert has operational relevance ("good alert"). If an event is understood but non-alertable because an event of this type is not of interest, the alerting rules are updated using suitable user interface (e.g., the digging is interesting to me, but only digging on the side of the road, not in the fields like you are showing me). Alternatively, the alert may simply be discarded and the processing for the alert ends 426 if the analysts judges that the event type is alertable, but this particular event is not of interest (e.g., I'm not too worried about this speeding vehicle, but keep showing them to me). Still alternatively, if the alert is not good, due to an insufficient breadth of explanation considered by the system, the analyst may provide additional domain descriptions 430 in terms of a new basis function built as previously described with help of the user interface (e.g., Yeah, that's a meeting allright, but you failed to consider it happens near a gas station, so it's probably just guys accidentally parking next to each other getting gas. Next time, consider whether the meeting occurs at a gas station or a store). If the alert is determined to be a good alert, the alert is processed as an operational event (e.g., Hey, I think we have identified a bad guy, do we want to intervene?) and the processing for the alert ends 426.

In the exemplary embodiment, the above described process is executed on one or more processors and memory devices such as those described with respect to FIG. 7. For example, processor 304 is programmed to execute computer-executable instructions, which may be stored in memory device 306, to perform the computations described herein. For example, any or all of the operations described herein may be encoded as computer-executable instructions and executed by processor 304.

The methods described herein may be encoded as executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk, that is operable to store data, such as computer-executable instructions.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for analyzing incentives and predicting future actions of agents whose incentives are unknown, said method comprising:
   storing, in a computer memory, data relating to previously observed behavior of at least one of an agent of interest and agents that can be assumed to hold similar utilities to the agent of interest, thereby defining an agent class;
   deriving with a processing device and based on the stored data, at least one unique incentive of the agent class by deriving at least a cost for each of a plurality of possible actions of the agent of interest;
   observing a sequence of behavior of the agent of interest;
   inputting the sequence of behavior to an analyzer;
   deriving at least one specific goal of the agent of interest based on the sequence of behavior; and
   predicting at least one future action of the agent of interest based on a maximization of reward for the agent of interest and the at least one derived goal, the reward based on the at least one derived incentive.

2. The computer-based method according to claim 1 wherein the step of predicting at least one future action of the agent of interest comprises analyzing at least one future action of the agent of interest based on the maximization of reward for the agent of interest.

3. The computer-based method according to claim 1 wherein the step of predicting at least one future action of the agent of interest comprises assigning a probability of being a goal of the agent of interest to each member of a set of possible goals.

4. The computer-based method according to claim 1 wherein the step of inputting the sequence of behavior to an analyzer comprises inputting the sequence of behavior into a processing device running an executable algorithm.

5. The computer-based method according to claim 1 further comprising pointing out a subsequent observed behavior of the agent of interest that does not conform to the at least one predicted future action.

6. The computer-based method according to claim 1 wherein deriving the cost for each of the plurality of possible actions of the agent of interest further comprises deriving the cost for each of the plurality of possible actions of the agent of interest in a mesh space.

7. The computer-based method according to claim 6 wherein deriving a cost for each possible action of the agent of interest comprises:
   associating a cost function with each of a plurality of state and action pairs, wherein each state and action pair defines one of the possible actions of the agent of interest;
   calculating a cost-to-go function expressing an unknown shortest distance associated with each of a plurality of destinations, wherein each destination is associated with a respective one of the possible actions; and
   using a function to denote the cost incurred by the unique action of moving to each destination.

8. The computer-based method according to claim 7 further comprising:
   adding a constraint for a path, the constraint specified as an interleaving sequence of states and a cost;
   inserting a "Bellman" constraint for each state on the path, and each neighboring state on the path; and
   solving the cost functions using a maximization objective that is the sum of terms expressing a margin for each action taken.

9. The computer-based method according to claim 7 wherein a cost is an expected cost thereby extending formulations to a probabilistic case.

10. The computer-based method according to claim 1 further comprising:
    determining that an action of the agent of interest is an anomaly; and
    at least one of:

disposing of the action as uninteresting such that it will not be further analyzed;

saving the action and explaining the action away by other incentives afforded to the agent of interest and not extending a basis function set that explains the behavior of the agent of interest; and constructing a basis function that explains the behavior of the agent of interest and extending the basis function set.

11. One or more non-transitory computer-readable storage media having computer-executable instructions embodied thereon, wherein when executed by at least one processor, the computer-executable instructions cause the at least one processor to:

receive and store data indicative of previous behavior of at least one of an agent of interest and agents that can be assumed to hold similar utilities to the agent of interest, thereby defining an agent class;

derive, based on the stored data, at least one unique incentive of the agent class by deriving at least a cost for each of a plurality of possible actions of the agent of interest;

receive data indicative of a sequence of behavior of the agent of interest;

derive at least one specific goal of the agent of interest based on the sequence of behavior; and predict at least one future action of the agent of interest based on a maximization of reward for the agent of interest, the reward based on the at least one derived incentive.

12. One or more non-transitory computer-readable storage media having computer-executable instructions embodied thereon according to claim 11 wherein to predict the at least one future action of the agent of interest, the computer-executable instructions cause the at least one processor to analyze the at least one future action of the agent of interest based on the maximization of reward for the agent of interest.

13. One or more non-transitory computer-readable storage media having computer-executable instructions embodied thereon according to claim 11 wherein to predict the at least one future action of the agent of interest, the computer-executable instructions cause the at least one processor to assign a probability of being a goal of the agent of interest to each member of a set of possible goals.

14. One or more non-transitory computer-readable storage media having computer-executable instructions embodied thereon according to claim 11 wherein the computer-executable instructions cause the at least one processor to point out a subsequent observed behavior of the agent of interest that does not conform to the at least one predicted future action.

15. One or more non-transitory computer-readable storage media having computer-executable instructions embodied thereon according to claim 11 wherein to derive the at least one incentive, the computer-executable instructions cause the at least one processor to derive the cost for each of the plurality of possible actions of the agent of interest in a mesh space.

16. One or more non-transitory computer-readable storage media having computer-executable instructions embodied thereon according to claim 11 wherein the computer-executable instructions cause the at least one processor to:

associate a cost function with each of a plurality of state and action pairs, wherein each state and action pair defines one of the possible actions of the agent of interest;

calculate a cost-to-go function expressing an unknown shortest distance associated with each of a plurality of destinations, wherein each destination is associated with a respective one of the possible actions; and use a function to denote the cost incurred by the unique action of moving to each destination.

17. One or more non-transitory computer-readable storage media having computer-executable instructions embodied thereon according to claim 16 wherein the computer-executable instructions cause the at least one processor to:

add a constraint for a path, the constraint specified as an interleaving sequence of states and a cost;

insert a "Bellman" constraint for each state on the path, and each neighboring state on the path; and solve the cost functions using a maximization objective that is the sum of terms expressing a margin for each action taken.

18. One or more non-transitory computer-readable storage media having computer-executable instructions embodied thereon according to claim 11 wherein the computer-executable instructions cause the at least one processor to:

determine that an action of the agent of interest is an anomaly; and at least one of:

dispose of the action as uninteresting such that it will not be further analyzed;

save the action and explaining the action away by other incentives afforded to the agent of interest and not extending a basis function set that explains the behavior of the agent of interest; and construct a basis function that explains the behavior of the agent of interest and extending the basis function set.

19. A method comprising:

utilizing the output of a tracking system to track and store observations of agent behaviors;

deriving at least one incentive by deriving at least a cost for each of a plurality of possible agent actions;

estimating a reward function for an agent based on the stored observations of the agent behaviors;

at least one of analyzing rewards for expected agent behaviors, predicting further agent behaviors, and analyzing tracks of agents behaviors to determine whether the tracks are consistent with utility bounds derived from an agent class; and determining, based on alerting rules defined by a user, whether an alert was understood and determined to be non-alertable, whether the alert should simply be discarded with no further processing, whether the alert is a result of behavior misunderstanding on part of the tracking system and providing a more relevant explanation, and whether to process a good alert as an operational event.

20. The method according to claim 19 wherein utilizing the output of a tracking system to track and store observations of agent behaviors comprises at least one of:

tracking and storing multiple instances of behavior performed by a single agent; and tracking and storing instances of behavior of multiple agents.

21. The method according to claim 19 further comprising exporting results of the determination in a common geospatial data format for output onto a user interface.

* * * * *